United States Patent
Glennon et al.

(10) Patent No.: US 11,147,205 B2
(45) Date of Patent: Oct. 19, 2021

(54) SYSTEM AND METHOD FOR MONITORING TOOL FLOAT ON AN AGRICULTURAL IMPLEMENT

(71) Applicant: CNH Industrial America LLC, New Holland, PA (US)

(72) Inventors: Michael Glennon, Normal, IL (US); William Edward Allen, Peoria, IL (US); Rick L. Gerber, Carlock, IL (US)

(73) Assignee: CNH Industrial America LLC, New Holland, PA (US)

(\*) Notice: Subject to any disclaimer, the term of this patent is extended or adjusted under 35 U.S.C. 154(b) by 318 days.

(21) Appl. No.: 16/278,948

(22) Filed: Feb. 19, 2019

(65) Prior Publication Data

US 2020/0260631 A1 Aug. 20, 2020

(51) Int. Cl.
| | |
|---|---|
| *A01B 63/32* | (2006.01) |
| *A01B 61/04* | (2006.01) |
| *A01B 76/00* | (2006.01) |
| *A01B 63/00* | (2006.01) |

(52) U.S. Cl.
CPC ............ *A01B 63/32* (2013.01); *A01B 61/044* (2013.01); *A01B 63/008* (2013.01); *A01B 76/00* (2013.01)

(58) Field of Classification Search
CPC ....... A01B 63/008; A01B 63/32; A01B 61/04; A01B 61/044; A01B 76/00
See application file for complete search history.

(56) References Cited

U.S. PATENT DOCUMENTS

| | | | |
|---|---|---|---|
| 5,961,573 A | 10/1999 | Hale et al. | |
| 6,834,550 B2 | 12/2004 | Upadhyaya et al. | |
| 7,360,495 B1* | 4/2008 | Martin | A01C 7/203 111/164 |
| 8,573,319 B1 | 11/2013 | Casper et al. | |
| 8,763,713 B2* | 7/2014 | Bassett | A01C 5/06 172/2 |
| 8,857,530 B2* | 10/2014 | Henry | A01B 63/114 172/4 |
| 9,232,687 B2 | 1/2016 | Bassett | |
| 9,554,504 B2 | 1/2017 | Houck | |

(Continued)

OTHER PUBLICATIONS

Gannon, Mary, Three Key Priorities for Successful Agricultural Hydraulic Design, CD Industrial Group, Inc, https://www.mobilehydraulictips.com/three-key-priorities-succesful-agricultural-hydraulic-design/, May 23, 2017, 9 pages.

*Primary Examiner* — Jessica H Lutz
(74) *Attorney, Agent, or Firm* — Rebecca L. Henkel; Rickard K. DeMille

(57) ABSTRACT

A system for monitoring tool float on an agricultural implement may include an implement frame, a rocker arm pivotably mounted to the implement frame, and a tool coupled to the rocker arm. The system may also include a biasing element coupled between the frame and the rocker arm, with the biasing element configured to permit the tool to move relative to the implement frame. Furthermore, the system may include a rotational position sensor configured to detect a parameter indicative of a rotational position of the rocker arm relative the implement frame, with the rotational position being indicative of an additional amount of available relative movement between the tool and the implement frame.

17 Claims, 5 Drawing Sheets

(56) References Cited

U.S. PATENT DOCUMENTS

| | | | |
|---|---|---|---|
| 9,664,249 B2 | 5/2017 | Kowalchuk | |
| 9,681,601 B2 | 6/2017 | Bassett | |
| 9,686,901 B2 | 6/2017 | Achen et al. | |
| 9,699,958 B2 | 7/2017 | Koch et al. | |
| 9,750,174 B2 * | 9/2017 | Sauder | G01D 5/142 |
| 9,814,172 B2 | 11/2017 | Achen et al. | |
| 9,933,787 B2 | 4/2018 | Story | |
| 9,961,822 B2 | 5/2018 | Sander et al. | |
| 10,645,865 B2 * | 5/2020 | Bassett | A01C 7/205 |
| 2014/0116736 A1 * | 5/2014 | Dietrich, Sr. | A01B 61/044 |
| | | | 172/664 |
| 2014/0216313 A1 * | 8/2014 | Bassett | A01B 49/06 |
| | | | 111/139 |
| 2015/0230391 A1 * | 8/2015 | Houck | A01B 79/005 |
| | | | 701/50 |
| 2018/0092287 A1 * | 4/2018 | Garner | A01C 7/084 |
| 2018/0139892 A1 * | 5/2018 | Knobloch | A01B 19/04 |
| 2018/0303022 A1 * | 10/2018 | Barrick | A01B 79/005 |
| 2019/0124824 A1 * | 5/2019 | Hubner | A01C 5/064 |
| 2019/0373797 A1 * | 12/2019 | Schoeny | A01C 7/203 |

\* cited by examiner

SYSTEM AND METHOD FOR MONITORING TOOL FLOAT ON AN AGRICULTURAL IMPLEMENT

FIELD OF THE INVENTION

The present disclosure generally relates to systems and methods for monitoring tool float on an agricultural implement and, more particularly, to systems and methods for monitoring tool float that determine the additional amount of available relative movement between a tool of an agricultural implement and a frame of the implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural vehicle, such as a tractor. As such, tillage implements typically include a plurality of tools configured to penetrate the soil to a particular depth. In this respect, the tools may be pivotably coupled to a frame of the tillage implement. Tillage implements may also include biasing elements, such as springs, configured to exert downward biasing forces on the tools. This configuration may allow the tools to maintain the particular depth of soil penetration as the vehicle pulls the tillage implement through the field. Additionally, this configuration may also permit the tools to pivot out of the way of rocks or other impediments in the soil, thereby preventing damage to the tools or other components on the implement (e.g., the implement frame).

Certain portions of the field may include a compacted or otherwise compressed top layer of soil. Such a compacted soil layer may exert a great enough force on the tools to overcome the downward biasing force being applied to the tools. As such, the tools may "float" or pivot relative to the implement frame to a shallower penetration depth. In such instances, the biasing elements may not permit enough additional relative movement between the tools and the implement frame to allow the tools to pivot out of the way of any rocks or other impediments.

Accordingly, an improved system and method for monitoring tool float on an agricultural implement would be welcomed in the technology. In particular, a system and method for monitoring tool float that determines an additional amount of available relative movement between the tool of an agricultural implement and a frame of the implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring tool float on an agricultural implement. The system may include an implement frame, a rocker arm pivotably mounted to the implement frame, and a tool coupled to the rocker arm. The system may also include a biasing element coupled between the frame and the rocker arm, with the biasing element configured to permit the tool to move relative to the implement frame. Furthermore, the system may include a rotational position sensor configured to detect a parameter indicative of a rotational position of the rocker arm relative the implement frame, with the rotational position being indicative of an additional amount of available relative movement between the tool and the implement frame.

In another aspect, the present subject matter is directed to a method for monitoring tool float on an agricultural implement. The agricultural implement may include a frame, a rocker arm pivotably mounted to the frame, and a tool coupled to the rocker arm. The agricultural implement may also include a biasing element coupled between the frame and the rocker arm, with the biasing element configured to permit the tool to move relative to the frame. The method may include receiving, with a computing device, data from a rotational position sensor configured to detect a parameter indicative of a rotational position of the rocker arm relative the frame. Furthermore, the method may include determining, with the computing device, an additional amount of available relative movement between the tool and the frame based on the received data. Additionally, when the determined additional amount of available relative movement between the tool and the frame falls below a predetermined threshold, the method may include initiating, with the computing device, a control action associated increasing the additional amount of available relative movement between the tool and the frame.

In a further aspect, the present subject matter is directed to a system for monitoring tool float on an agricultural implement. The system may include an implement frame and a tool supported by the implement frame. The system may also include a rocker arm pivotably mounted to the implement frame. Furthermore, the system may include a first biasing element coupled between a first end of the rocker arm and the implement frame and a second biasing element coupled between a second end of the rocker arm and the tool. As such, the first biasing element and the second biasing element may be configured to permit the tool to move relative to the implement frame.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
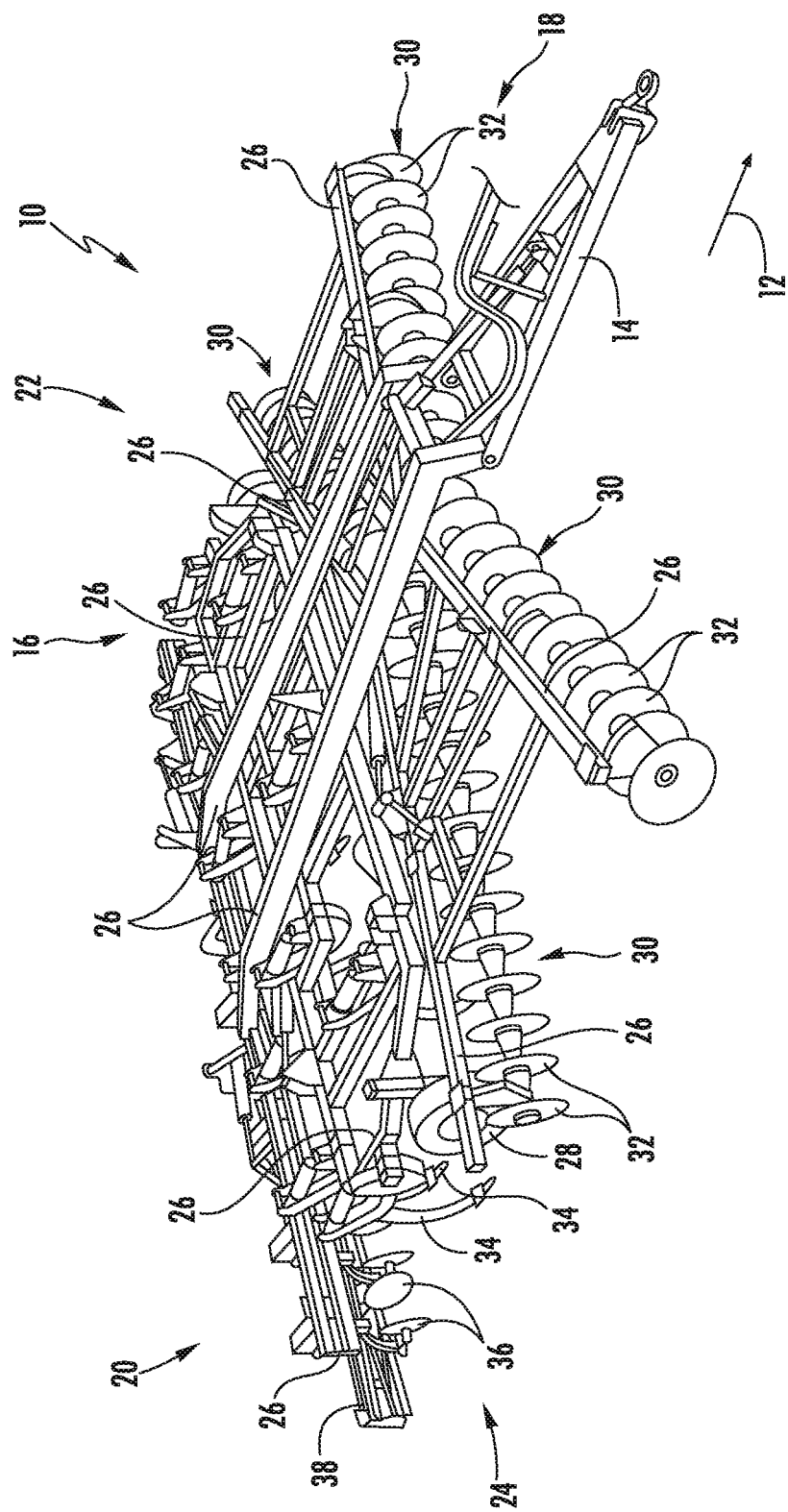
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring tool float on an agricultural implement. Specifically, in several embodiments, the system may include one or more suitable components configured to permit a tool(s) (e.g., a disc blade(s)) to move relative to a frame of the implement. For example, in one embodiment, the implement may include a rocker arm pivotably mounted to the frame and an actuator (e.g., a fluid-driven cylinder) coupled between one end of the rocker arm and the tool(s). Furthermore, the implement may include a biasing element (e.g., one or more springs) coupled between the other end of the rocker arm and the frame. In this regard, when the tool(s) contacts a rock or other impediment in the soil, the tool(s) may move relative to the frame to prevent the tool(s) (or another component(s) of the implement) from being damaged. In such instances, the tool(s) may move to a shallower depth, thereby rotating the rocker arm in a manner that extends or compresses the biasing element.

In accordance with aspects of the present subject matter, a controller of the disclosed system may be configured to determine the additional amount of available relative movement between the tool(s) and the implement frame. Specifically, in several embodiments, the controller may be configured to receive data from a position sensor, with the position sensor configured to detect the rotational position of the rocker arm relative the frame. The rotational position of the rocker arm may, in turn, be indicative of the amount that the biasing element has already been extended/compressed by movement of the tool(s) relative to the frame. As such, the controller may be configured to determine the additional amount of available relative movement between the tool(s) and the frame based on the received data. For example, in one embodiment, the controller may determine the additional amount of relative movement based on the amount of additional extension/compression that the biasing element can undergo due to further rocker arm rotation. Additionally, when the determined additional amount of available relative movement between the tool and the frame falls below a predetermined threshold, the controller may be configured to initiate a control action associated with increasing the additional amount of available relative movement between the tool and the frame. For example, in one embodiment, the controller may be configured to control the operation of the actuator in a manner that increases the penetration depth of the tool such that the biasing element is able to provide additional available relative movement between the tool and the frame.

The present subject matter will generally be described herein in the context of determining the additional amount of available relative movement between a plurality of disc blades and a frame of a tillage implement, such as a disc harrow. However, it should be appreciated that the disclosed system and method may also be used to determine the additional amount of available relative movement between any other type of tool and an agricultural implement, such as a shank, chisel, hoe, and/or the like.

Referring now to the drawings. FIG. 1 illustrates a perspective view of one embodiment of an agricultural implement 10 in accordance with aspects of the present subject matter. As shown in the illustrated embodiment, the implement 10 may be configured to be towed across a field in a direction of travel (e.g., as indicated by arrow 12) by an agricultural vehicle (not shown), such as a tractor or other vehicle. The implement 10 may be coupled to the vehicle via a hitch assembly 14 or using any other suitable attachment means.

The implement 10 may also include an implement frame 16. As shown, the frame 16 may extend longitudinally between a forward end 18 and an aft end 20. The frame 16 may also extend laterally between a first side 22 and a second side 24. Furthermore, the frame 16 generally includes a plurality of structural frame members 26, such as beams, bars, and/or the like, configured to support or couple to a plurality of components. Additionally, a plurality of wheels 28 (one is shown) may be coupled to the frame 16 to facilitate towing the implement 10 in the direction of travel 12.

In several embodiments, the frame 16 may be configured to support one or more gangs or sets 30 of disc blades 32. Each disc blade 32 may, in turn, be configured to penetrate into or otherwise engage the soil as the implement 10 is being pulled through the field. In this regard, the various disc gangs 30 may be oriented at an angle relative to the direction of travel 12 to promote more effective tilling of the soil. In the embodiment shown in FIG. 1, the implement 10 includes four disc gangs 30 supported on the frame 16 adjacent to its forward end 18. However, it should be appreciated that, in alternative embodiments, the implement 10 may include any other suitable number of disc gangs 30, such as more or fewer than four disc gangs 30. Furthermore, in one embodiment, the disc gangs 20 may be mounted to the frame 16 at any other suitable location, such as adjacent to its aft end 20.

Additionally, as shown, in one embodiment, the implement frame 16 may be configured to support other tools. For instance, in the illustrated embodiment, the frame 16 is configured to support a plurality of shanks 34 configured to rip or otherwise till the soil as the implement 10 is towed across the field. Furthermore, in the illustrated embodiment, the frame 16 is also configured to support a plurality of leveling blades 36 and rolling (or crumbler) basket assemblies 38. However, in other embodiments, any other suitable tools may be coupled to and supported by the implement frame 16, such as a plurality closing discs.

Figure 2:
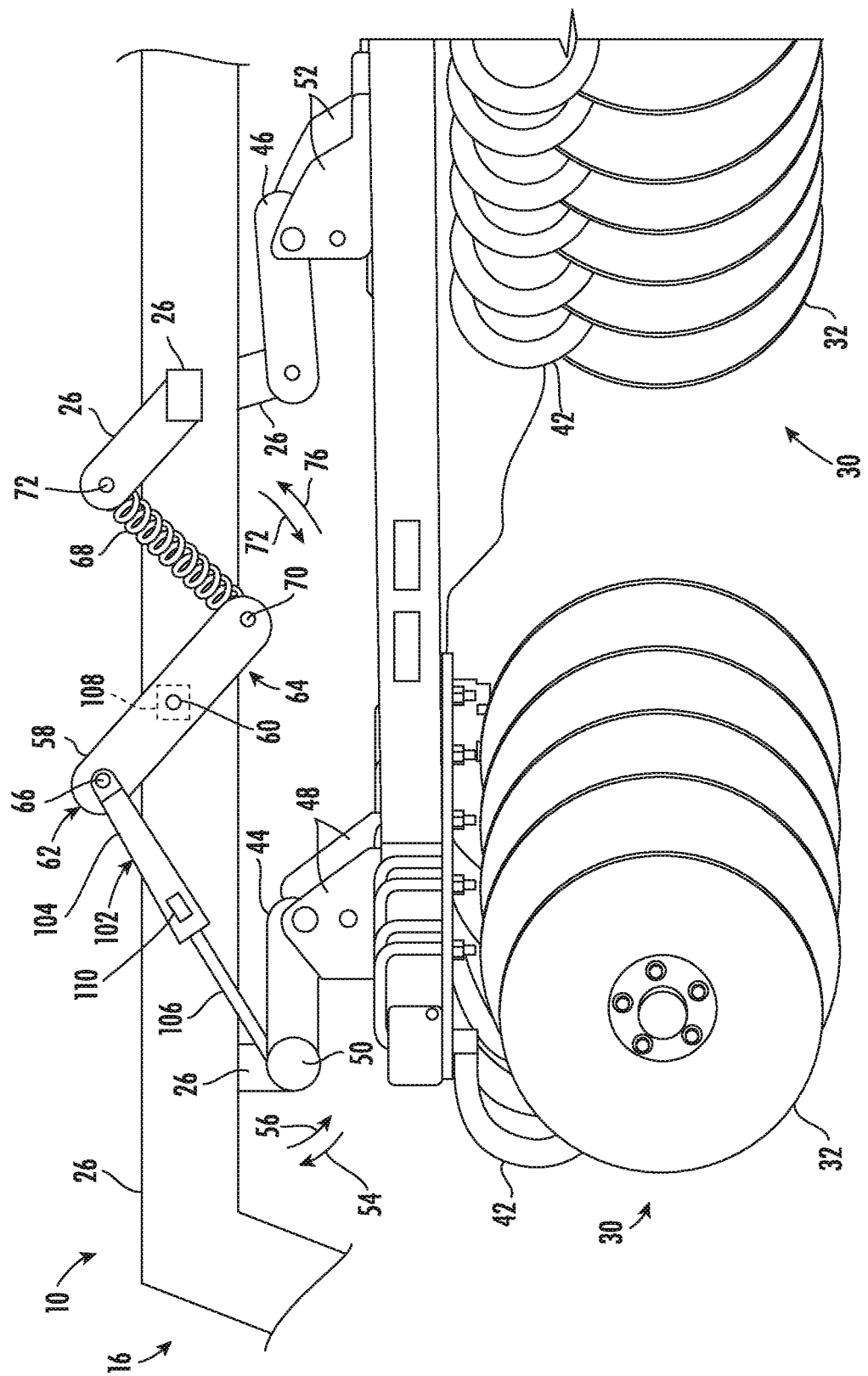
FIG. 2 illustrates a side view of the agricultural implement shown in FIG. 1, particularly illustrating various components of the implement in accordance with aspects of the present subject matter.

Referring now to FIG. 2, a partial, side view of the implement 10 described above with reference to FIG. 1 is illustrated in accordance with aspects of the present subject matter. As shown, the disc gangs 30 may be adjustably mounted to the implement frame 16. Specifically, in several embodiments, the disc gangs 30 may be coupled to or otherwise supported by a disc harrow frame 40, such as via a plurality of hangers 42 (e.g., C-hangers). The disc harrow frame 40 may, in turn, be coupled to the implement frame 16 by a plurality of support arms 44, 46. For example, in one embodiment, first ends of a pair of forward support arms 44 may be coupled to corresponding brackets 48, which are, in turn, coupled to a forward end of the disc harrow frame 40. Conversely, opposed second ends of the forward support arms 44 may be coupled to a rockshaft 50, which is, in turn, rotatably coupled to one of the frame members 26. Moreover, in such embodiment, first ends of a pair of aft support arms 46 may be coupled to corresponding brackets 52, which are, in turn, coupled to an aft end of the disc harrow frame 40, while opposed second ends of the aft support arms 46 may be coupled to one of the frame members 26. Rotation of the rockshaft 50 in a first direction (e.g., as indicated by arrow 54 in FIG. 2) may adjust the position of the disc gangs 30 relative to the implement frame 16 such that the penetration depth of the disc blades 32 are increased. Conversely, rotation of the rockshaft 50 in an opposite, second direction (e.g., as indicated by arrow 56 in FIG. 2) may adjust the position of the disc gangs 30 relative to the implement frame 16 such that the penetration depth of the disc blades 32 are decreased. However, in alternative embodiments, the disc gangs 30 may be adjustably coupled to the implement frame 16 in any other suitable manner.

Furthermore, the implement 10 may include a plurality of components configured to adjust the position of the disc gangs 30 relative to the frame 16 such that the disc blades 32 penetrate the ground to the desired depth. As such, in several embodiments, the implement 10 may include a rocker arm 58 coupled to the frame 16 and an actuator or biasing element 102 coupled between the rocker arm 58 and the rockshaft 50. Specifically, as shown in FIG. 2, the rocker arm 58 may be pivotably coupled to one of the frame members 26 at a pivot joint 60, with such pivot joint 60 being located between opposing first and second ends 62, 64 of the rocker arm 58. Moreover, a first end of the actuator 102 (e.g., a cylinder 104 of the actuator 102) may be coupled to the first end 62 of the rocker arm 58 at a pivot joint 66, while a second end of the actuator 102 (e.g., a rod 106 of the actuator 102) may be coupled to the rockshaft 50. The rod 106 may be configured to extend and/or retract relative to the cylinder 104 to adjust the penetration depths of the disc blades 32. For example, the rod 106 may extend relative to the cylinder 104 such that the rockshaft 50 is rotated in the first direction 54, thereby increasing the penetration depth of the disc blades 32. Conversely, the rod 106 may retract relative to the cylinder 104 such that the rockshaft 50 is rotated in the second direction 56, thereby decreasing the penetration depth of the disc blades 32. In this regard, the length of the actuator 102 may set the penetration depth of the disc blades 32. It should be appreciated that extension/retraction of the actuator 102 to adjust the penetration depth of the disc blades 32 may generally not adjust the down pressure being applied to the disc blades 32.

Moreover, it should be appreciated that the actuator 102 may correspond to any suitable device configured to rotate the rockshaft 50 relative to the implement frame 16. For example, in one embodiment, the actuator 102 corresponds to a fluid-driven actuator, such as a hydraulic or pneumatic cylinder. However, the actuator 102 may correspond to any other suitable type of actuator, such as an electric linear actuator.

Additionally, the implement 10 may include a biasing element 68 coupled between the rocker arm 58 and the implement frame 16. In general, the biasing element 68 may be configured to bias the disc blades 32 to a desired penetration depth, while still allowing the blades 32 to pivot out of the way of rocks and other impediments in the field. Specifically, in several embodiments, one end of the biasing element 68 may be pivotably coupled to the second end 64 of the rocker arm 58 at a pivot joint 70, while an opposed end of the biasing element 68 may be pivotably coupled to one of the frame members 26 at a pivot joint 72. As such, the biasing element 68 may be configured to exert a biasing force on the second end 64 of the rocker arm 58 that counteracts the force exerted on the first end 62 of the rocker arm 58 by the actuator 102 such that the penetration depth of the disc blades 32 set by the actuator 102 (e.g., based on the amount of extension of the its rod 106) is maintained. Moreover, when the disc blades 32 encounter rocks or other impediments within the field, the biasing element 68 may extend in a manner that permits the disc gangs 32 pivot to a shallower penetration depth. For example, when the disc blades 32 encounter a field impediment, the disc gangs 30 and the disc harrow frame 40 may generally move upward relative to the implement frame 16 in a manner that causes the rockshaft 50 to rotate in the second direction 56. In such instances, the length of the actuator 102 may generally remain constant to maintain the set or desired penetration depth of the disc blades 32 once the disc blades 32 pass over the impediment. As such, the rotation of the rockshaft 50 in the second direction 56 may cause the rocker arm 58 to rotate in a first direction (e.g., as indicated by arrow 74 in FIG. 2), thereby extending the biasing element 68. Once the disc blades 32 pass over the field impediment, the biasing element 68 may compress such that the rocker arm 58 is rotated in an opposite, second direction (e.g., as indicated by arrow 76 in FIG. 2). Such rotation in the second direction 76 may cause the rockshaft 52 rotate in the first direction 54, thereby returning the disc blades 32 to the set or desired penetration depth.

It should be appreciated that the biasing element 68 may correspond to any suitable device configured to bias the disc blades 32 to a desired penetration depth. For instance, as shown in the illustrated embodiment, the biasing element 68 corresponds to a spring-loaded device, including one or more coil springs. However, the biasing element may correspond to any other suitable device, such as a fluid-driven cylinder or a linear actuator.

Additionally, it should be appreciated that the rocker arm 58, the biasing element 68, and the actuator 102 may be configured in any other suitable manner configured to bias the disc blades 32 to a desired penetration depth, while still allowing the blades 32 to pivot out of the way of rocks and other impediments in the field. For example, in one embodiment, the rocker arm 58, the biasing element 68, and the actuator 102 may be configured such that the biasing element 68 compresses when the disc blades 32 pivot to a shallower penetration depth and extends when the blades pivot to a deeper penetration depth.

In accordance with aspects of the present subject matter, a rotational position sensor 108 may be configured to detect the rotational position or angular orientation of the rocker arm 58 relative to the frame member 26 to which it is pivotably coupled. By detecting the rotational position of the rocker arm 58 relative to the frame member 26, the sensor 108 may be configured to indirectly detect the amount that the biasing element 68 has already been extended by movement of the disc gangs 30 relative to the frame 16. Accordingly, the rotational position of the rocker arm 58 relative to the frame member 26 may be used to determine the additional amount of available relative movement between the disc gangs 30 and the frame 16 based on the additional amount that the biasing element 68 may extend due to further rotation of the rocker arm 58 in the first direction 74.

Figure 3:
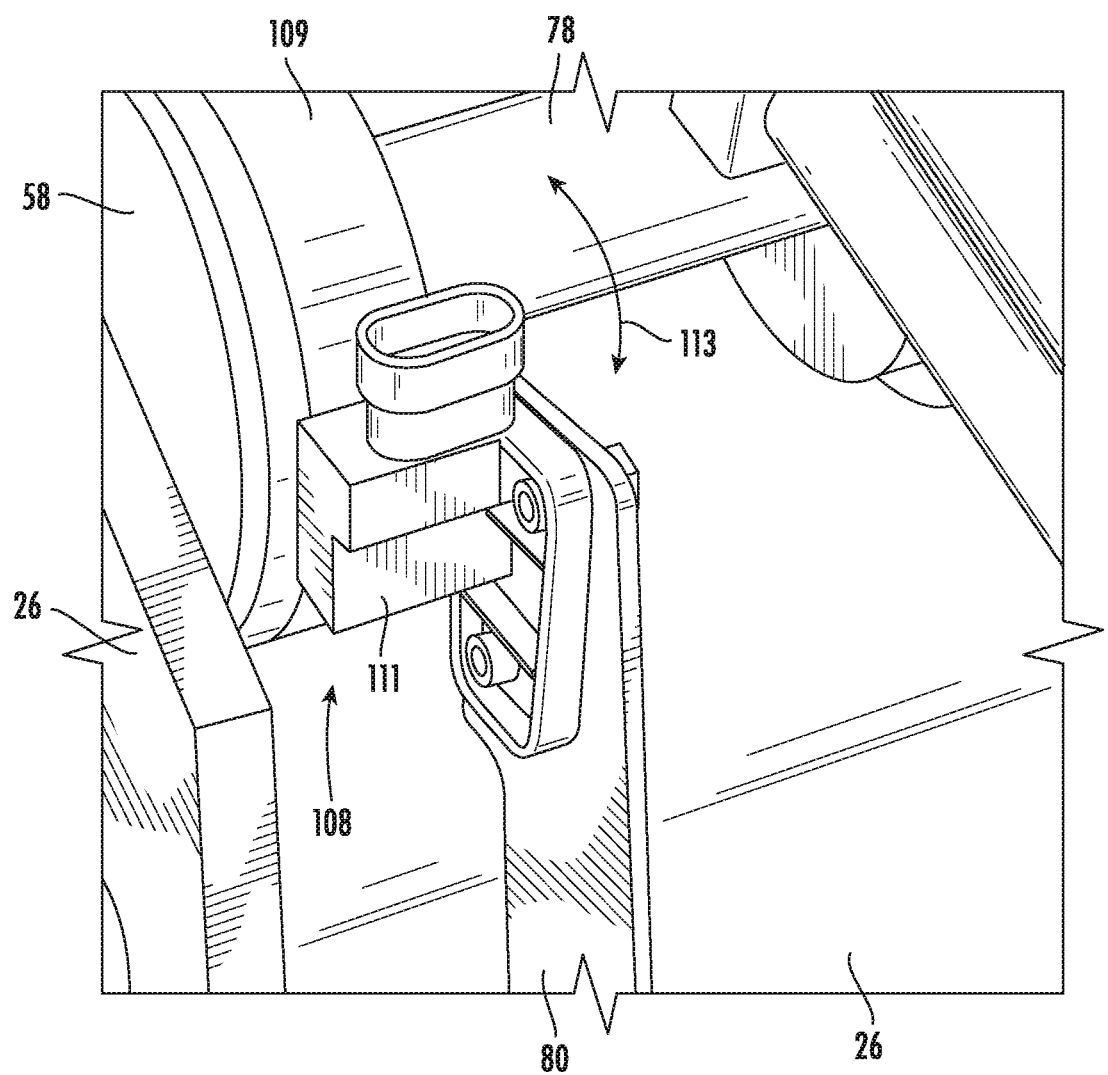
FIG. 3 illustrates a perspective view of one embodiment of a rotational position sensor suitable for use on the agricultural implement shown in FIG. 2.

It should be appreciated that the rotational position sensor 108 may generally correspond to any suitable sensor or sensing device configured to directly or indirectly detect the amount that the biasing element 68 has already been extended by movement of the disc gangs 30 relative to the frame 16. For example, in several embodiments, the sensor 108 may correspond to a Hall effect sensor provided in operative association with the pivot joint 60 between the rocker arm 58 and the frame member 26. For example, as shown in FIG. 3, in one embodiment, the sensor 108 may include a magnet 109 mounted on a shaft 78. The shaft 78 may, in turn, be rotatably coupled to the frame member 26 and the fixedly coupled to the rocker arm 58 such that the shaft 78 forms the pivot joint 70. Furthermore, the sensor 108 may also include a sensing device 111 mounted on a post 80 that is coupled to the frame member 26, with the sensing device 111 configured to detect movement of the magnet 109. For example, when the rocker arm 58 pivots (e.g., in either of the directions 72, 76), the shaft 78 and the magnet rotate relative to the frame member 26 such that the magnet 109 moves relative to the sensing device 111 (e.g., as indicated by arrow 113 in FIG. 3). Such movement may, in turn, be indicative of the rotational position or angular orientation of the rocker arm 58 relative to the frame member 26. However, in alternative embodiments, the sensor 108 may correspond to any other suitable sensing device, such as a linear potentiometer, a proximity sensor, and/or any other suitable transducer (e.g., ultrasonic, electromagnetic, infrared, etc.) that allows the amount of extension of the biasing element 68 to be directly or indirectly detected.

Referring again to FIG. 2, in several embodiments, a depth sensor 110 may be configured to detect the penetration depths of the disc blades 32 (e.g., by detecting the extension and/or retraction of the rod 106 of the actuator 102 relative to the cylinder 104 of the actuator 102). By detecting the extension/retraction of the rod 106 relative to the cylinder 104, the sensor 110 may be configured to indirectly detect the position of the disc gangs 30 relative to the implement frame 16. Accordingly, the extension/retraction of the rod 106 relative the cylinder 104 may be used to determine the current penetration depth of the disc blades 32.

It should be appreciated that the depth sensor 110 may generally correspond to any suitable sensor or sensing device configured to directly or indirectly detect the penetration depth of the disc blades 32. For example, in several embodiments, the sensor 110 may correspond to a linear potentiometer integrated into or otherwise provided in operative association with the cylinder 104 such the potentiometer may detect the extension/retraction of the rod 106 relative to the cylinder 104. However, in alternative embodiments, the sensor 110 may correspond to any other suitable sensing device, such as rotary sensor and associated linkage, a proximity sensor, and/or any other suitable transducer (e.g., ultrasonic, electromagnetic, infrared, etc.) that allows the penetration depths of the disc blades 32 to be directly or indirectly detected.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 4:
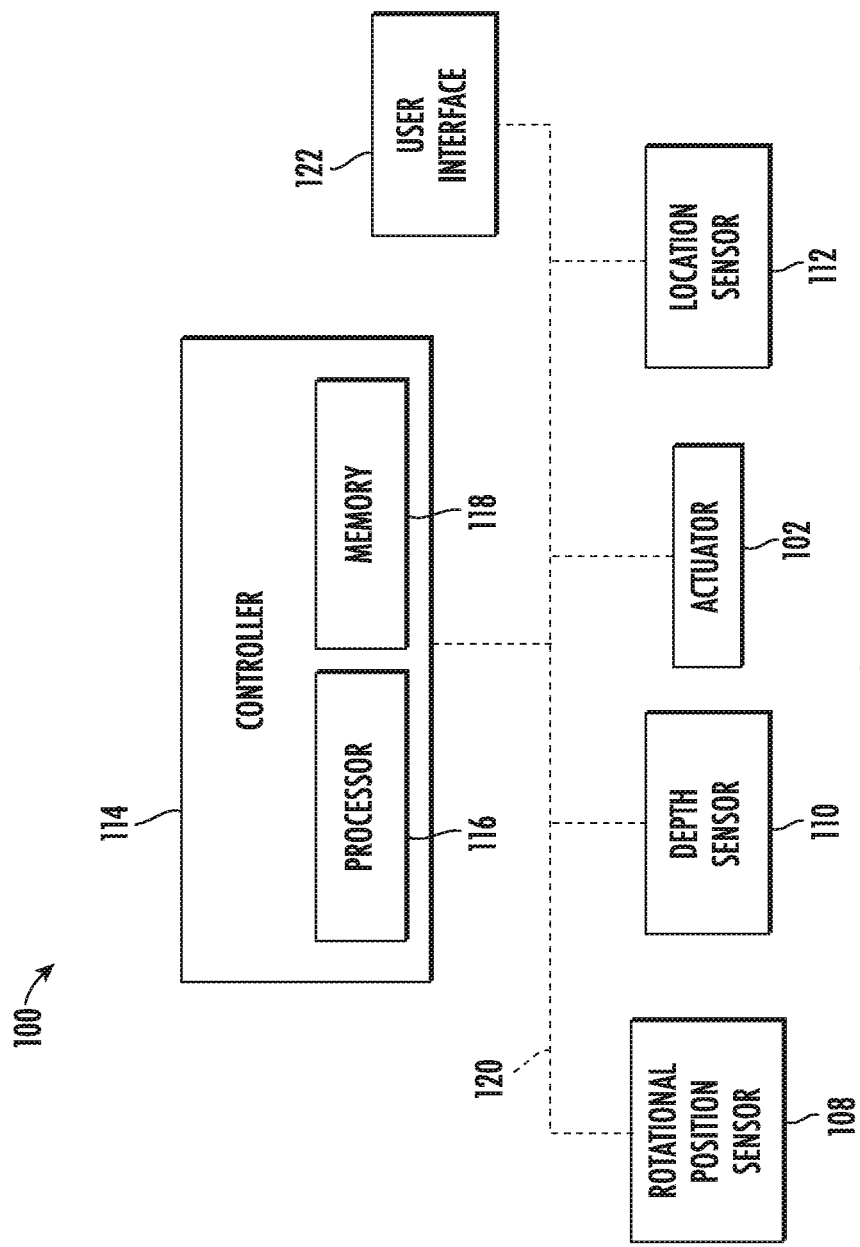
FIG. 4 illustrates a schematic view of one embodiment of a system for monitoring tool float on an agricultural implement in accordance with aspects of the present subject matter.

Referring now to FIG. 4, a schematic view of one embodiment of a system 100 for monitoring tool float on an agricultural implement is illustrated in accordance with aspects of the present subject matter. In general, the system 100 will be described herein with reference to the implement 10 described above with reference to FIGS. 1 and 2. However, it should be appreciated by those of ordinary skill in the art that the disclosed system 100 may generally be utilized with implements having any other suitable implement configuration.

As shown in FIG. 4, the system 100 may include a location sensor 112 provided in operative association with the implement 10 or an associated agricultural vehicle (not shown). In general, the location sensor 112 may be configured to determine the exact location of the implement 10 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 112 may be transmitted to a controller(s) of the implement 10 and/or the associated vehicle (e.g., in the form coordinates) and stored within the controller's memory for subsequent processing and/or analysis. For instance, based on the known dimensional configuration and/or relative positioning between the disc blades 32 and the location sensor 112, the determined location from the sensor 112 may be used to geo-locate the blades 32 within the field.

In accordance with aspects of the present subject matter, the system 100 may include a controller 114 positioned on and/or within or otherwise associated with the implement 12 or an associated agricultural vehicle. In general, the controller 114 may comprise any suitable processor-based device known in the art, such as a computing device or any suitable combination of computing devices. Thus, in several embodiments, the controller 114 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 118 of the controller 114 may generally comprise memory element (s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 118 may generally be configured to store suitable computer-readable instructions that, when implemented by the processor(s) 116, configure the controller 114 to perform various computer-implemented functions.

In addition, the controller 114 may also include various other suitable components, such as a communications circuit or module, a network interface, one or more input/output channels, a data/control bus and/or the like, to allow controller 114 to be communicatively coupled to any of the various other system components described herein (e.g., the actuator 102, the rotational position sensor 108, the depth sensor 110, and/or the location sensor 112). For instance, as shown in FIG. 4, a communicative link or interface 120 (e.g., a data bus) may be provided between the controller 114 and the components 102, 108, 110, 112 to allow the controller 114 to communicate with such components 102, 108, 110, 112 via any suitable communications protocol (e.g., CANBUS).

It should be appreciated that the controller 114 may correspond to an existing controller(s) of the implement 10 and/or an associated agricultural vehicle, itself, or the controller 114 may correspond to a separate processing device. For instance, in one embodiment, the controller 114 may form all or part of a separate plug-in module that may be installed in association with the implement 10 and/or the vehicle to allow for the disclosed systems to be implemented without requiring additional software to be uploaded onto existing control devices of the implement 10 and/or the vehicle. It should also be appreciated that the functions of the controller 114 may be performed by a single processor-based device or may be distributed across any number of processor-based devices, in which instance such devices may be considered to form part of the controller 114. For instance, the functions of the controller 114 may be distributed across multiple application-specific controllers, such as a navigation controller, an implement controller, and/or the like.

Furthermore, in one embodiment, the system 100X) may also include a user interface 122. More specifically, the user interface 122 may be configured to provide feedback (e.g., feedback associated with the operation of the disc blades 32) to the operator of the implement 10 and/or the associated agricultural vehicle. As such, the user interface 122 may include one or more feedback devices (not shown), such as display screens, speakers, warning lights, and/or the like, which are configured to provide feedback from the controller 114 to the operator. The user interface 122 may, in turn, be communicatively coupled to the controller 114 via the communicative link 120 to permit the feedback to be transmitted from the controller 114 to the user interface 122. In addition, some embodiments of the user interface 122 may include one or more input devices (not shown), such as touchscreens, keypads, touchpads, knobs, buttons, sliders, switches, mice, microphones, and/or the like, which are configured to receive user inputs from the operator.

In several embodiments, the controller 114 may be configured to determine the additional amount of available relative movement between the disc blades 32 of the implement 10 and the implement frame 16. As described above, the biasing element 68 of the implement 10 may permit the disc blades 32 to move relative to the frame 16 in a manner that allows the blades 32 to pivot to a shallower penetration depth when encountering rocks and other field impediments. However, in certain instances, the disc blades 32 may encounter compacted or hard soil (e.g., due to heavy vehicle traffic, ponding, and/or the like) that exerts a great enough force on the blades 32 such that the biasing force being applied thereto by the biasing element 68 is overcome. In such instances, the biasing element 68 may be compressed in a manner that causes the disc blades 32 "float." In general, the disc blades 32 may "float" when the blades 32 pivots to a shallower penetration depth than its desired penetration depth for an extended period of time, such as a period of time that is greater than is necessary for the blades 32 to pass over a field impediment (e.g., more than one second). As will be described below, when the disc blades 32 "float," the biasing element 68 may not permit enough additional relative movement between the blades 32 and the frame 16 to allow the blades 32 to pivot out of the way of any rocks or other impediments. In this regard, the controller 114 may be configured to determine the additional amount of available relative movement between the disc blades 32 and the frame 16 based on the amount that the biasing element 68 has already been extended.

In one embodiment, the controller 114 may be configured to determine the additional amount of available relative movement between the disc blades 32 and the frame 16 based on the rotational position of the rocker arm 58. More specifically, when the disc blades 32 pivot to a shallower penetration depth (e.g., when "floating" due to contact with compacted soil), the rocker arm 58 may rotate relative to the associated frame member 26 in the first direction 74 such that the biasing element 68 is extended. Since the biasing element 68 may only extend a finite amount, the rotational position of the rocker arm 58 relative to the associated frame member 26 may be indicative of the additional amount that the biasing element 68 is able to extend. The additional amount of available extension of the biasing element 68 may, in turn, be indicative of the additional amount of available relative movement between the disc blades 32 and the frame 16. In this regard, and as indicated above, the rotational position sensor 108 may be configured to capture data indicative of the rotational position of the rocker arm 58 relative to the associated frame member 26. As such, the controller 114 may be configured to receive data from the rotational position sensor 108 (e.g., via the communicative link 120). Thereafter, the controller 114 may be configured to analyze/process the received data to determine the additional amount of available relative movement between the disc blades 32 and the frame 16. For instance, the controller 114 may include a look-up table(s), suitable mathematical formula, and/or algorithms stored within its memory 118 that correlates the received data to the additional amount of available relative movement between the disc blades 32 and the frame 16.

In accordance with aspects of the present subject matter, the controller 114 may be configured to initiate one or more control actions when the determined additional amount of available relative movement between the disc blades 32 and the frame 16 falls below a predetermined minimum threshold. In general, there may be a minimum amount of available relative movement between the disc blades 32 and the frame 16 that is necessary during the operation of the implement 10 to prevent damage to the implement 10 should the blades 32 encounter field impediments. In certain instances, when the disc blades 32 "float," the biasing element 68 extend to such an extent that the biasing element 68 is unable to accommodate the necessary further extension to permit the disc blades 32 to pivot out of the way of field impediments. As such, the controller 114 may be configured to compare the determined amount of additional available relative movement between the disc blades 32 and the frame 16 to a predetermined minimum threshold associated with the minimum amount of necessary available relative movement. Thereafter, when the determined amount of additional available relative movement falls below the predetermined minimum threshold (thereby indicating that insufficient additional available relative movement between the disc blades 32 and the frame 16 exists to permit the blades 32 to pivot out of the way of field impediments), the controller 114 may be configured to initiate one or more control actions. Such control action(s) may generally be associated with increasing the additional amount of available relative movement between the disc blades 32 and the frame 16.

In several embodiments, when the determined amount of additional available relative movement falls below the predetermined minimum threshold, the controller 114 may be configured to actively adjust the rotational position of the rocker arm 58 in a manner that increases the amount of available additional relative movement between the disc blades 32 and the frame 16. More specifically, in such instances, the controller 114 may be configured to transmit instructions to the actuator 102 (e.g., via the communicative link 120) instructing the actuator 102 to adjust its operation in a manner that increases the amount available relative movement between the disc blades 32 and the frame 16. For example, upon receipt of such instructions from the controller 114, the rod 106 of the actuator 102 may be retracted relative the cylinder 104 of the actuator 102 such that the rocker arm 58 is rotated in the second direction 76. Movement of the rocker arm 58 in the second direction 76 may, in turn, compress the biasing element 68 such that the amount of additional available extension of the biasing element 68 is increased. Such additional available extension of the biasing element 68 may, in turn, provide additional available relative movement between the disc blades 32 and the frame 16 is permitted. However, it should be appreciated that, the controller 114 may be configured to control the operation of the actuator 102 in any other suitable manner that provides additional available relative movement between the disc blades 32 and the frame 16 when the determined additional available relative movement falls below the predetermined minimum threshold.

It should be appreciated that the active adjustments of the position of the rocker arm 58 relative to the frame 16 may generally cause the penetration depth of the disc blades 32 set by the actuator 102 to change. For example, when the rod 106 is retracted relative to the cylinder 104 to increase the additional amount available relative movement between the disc blades 32 and the frame 16 as described above, the penetration depth of the disc blades 32 set by the actuator 102 may decrease. In general, it may be desirable to decrease the penetration depth of the disc blades 32 when the blades 32 are in contact with compacted soil to permit additional available relative movement between the displaced 32 and the frame 16 to accommodate rocks and other impediments within the field. However, if the penetration depth of the disc blades is decreased too much, the tillage operation being performed by the implement 10 may be adversely affected.

In one embodiment, the controller 114 may be configured to actively adjust the rotational position of the rocker arm 58 in a manner that maintains the penetration depth of the disc blades 32 set by the actuator 102 within a predetermined range of penetration depths. Specifically, in such embodiment, the controller 114 may be configured to monitor the penetration depth of the disc blades 32 as the implement is moved across the field. For example, as described above, a depth sensor 110 may be configured to capture data indicative of the penetration depth of the disc blades 32. As such, the controller 114 may be configured to receive data from the depth sensor 110 (e.g., via the communicative link 120). Thereafter, the controller 114 may be configured to analyze/process the received data to determine the penetration depth of the disc blades 32. For instance, the controller 114 may include a look-up table(s), suitable mathematical formula, and/or algorithms stored within its memory 118 that correlates the received data to the penetration depth of the disc blades 32. Thereafter, when the determined amount of available relative movement between the disc blades 32 and the frame 16 has fallen below the predetermined minimum threshold, the controller 114 may initiate active adjustments of the rotational position of the rocker arm 58 so long as the active adjustments will not cause the monitored penetration depth of the disc blades 32 to fall outside of the predetermined range.

Additionally, the controller 114 may be configured to generate a field map illustrating the penetration depth of the disc blades 32 at various locations within the field. More specifically, as described above, the controller 114 may be configured to geo-locate the position of the disc blades 32 within the field and monitor the penetration depth of the blades 32 as the implement 10 is being moved across the field. As such, the controller 114 may associate each penetration depth measurement with the position in the field where the measurement was captured. The penetration depth of the disc blades 32 may, in turn, be indicative of the location of rocks, field impediments, compacted soil, and/or the like. Thereafter, the controller 114 may be configured to generate a field map (e.g., a graphical field map) illustrating the penetration depth of the disc blades 32 and/or the presence of rocks, field impediments, and/or compacted soil at various positions within the field. For instance, the controller 114 may be configured to execute one or more algorithms stored within its memory 118 that generate the field map based on the data received depth sensor 110 and the location sensor 112 (e.g., via the communicative link 120). In one embodiment, the controller 114 may be configured to transmit instructions to the user interface 122 (e.g., the communicative link 218) instructing the user interface 122 to display the field map (e.g., a graphical field map).

Figure 5:
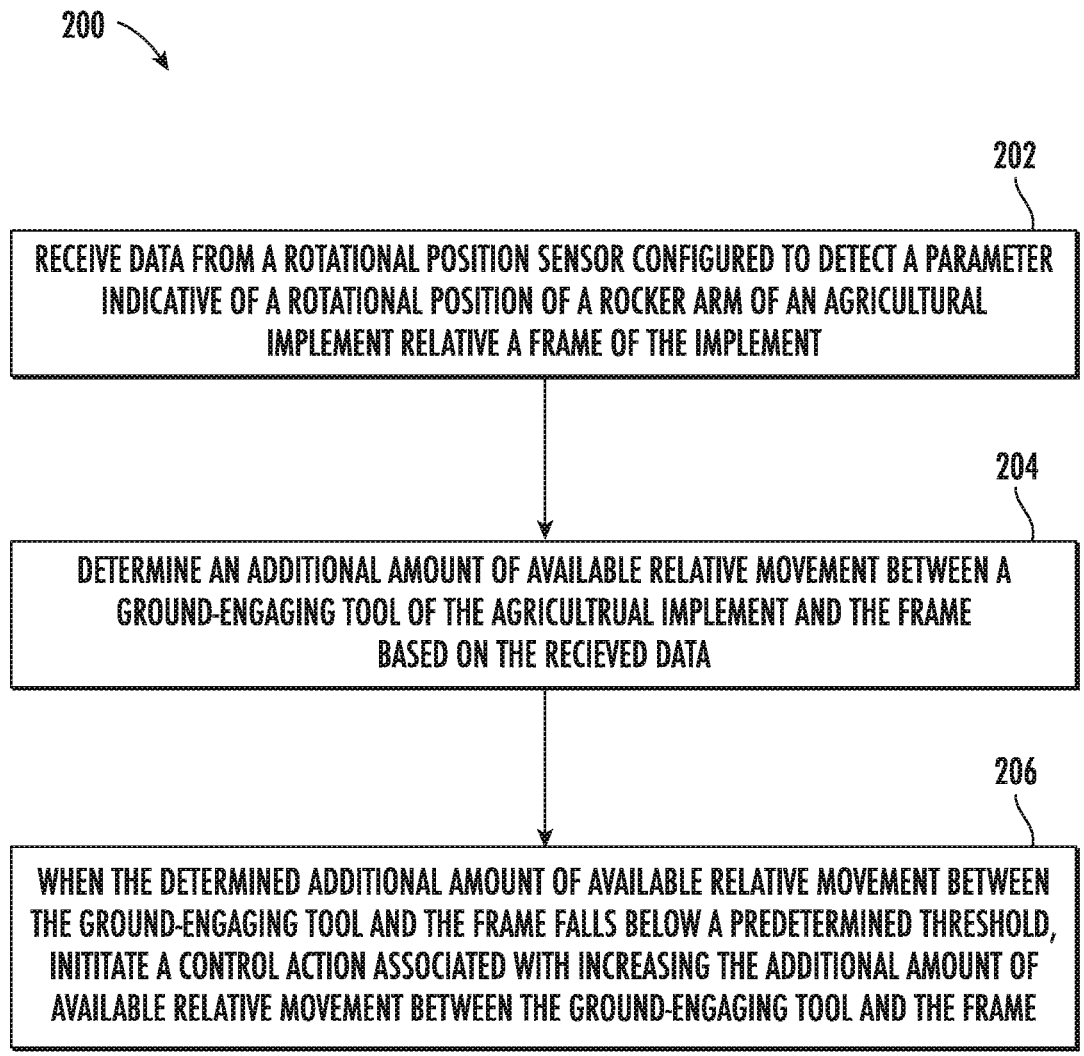
FIG. 5 illustrates a flow diagram of one embodiment of a method for monitoring tool float on an agricultural implement in accordance with aspects of the present subject matter.

Referring now to FIG. 5, a flow diagram of one embodiment of a method 200 for monitoring tool float on an agricultural implement is illustrated in accordance with aspects of the present subject matter. In general, the method 200 will be described herein with reference to the implement 10 and the system 100 described above with reference to FIGS. 1-3. However, it should be appreciated by those of ordinary skill in the art that the disclosed method 200 may generally be implemented with any implement having any suitable implement configuration and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving, with a computing device, data from a rotational position sensor configured to detect a parameter indicative of a rotational position of a rocker arm of an agricultural implement relative a frame of the implement. For instance, as described above, the controller 114 may be configured to receive data from a rotational position sensor 108, with the sensor 108 be configured to detect the rotational position of a rocker arm 58 of an agricultural implement 10 relative to a frame 16 of the implement 10.

Additionally, at (204), the method 200 may include determining, with the computing device, an additional amount of available relative movement between a tool of the agricultural implement and the frame based on the received data. For instance, as described above, the controller 114 may be configured to determine an additional amount of available relative movement between the disc blades 32 of the implement 10 and the frame 16 based on the received data.

Moreover, as shown in FIG. 5, at (206), when the determined additional amount of available relative movement between the tool and the frame falls below a predetermined threshold, the method 200 may include initiating, with the computing device, a control action associated increasing the additional amount of available relative movement between the tool and the frame. For instance, as described above, the controller 114 may be configured to initiate one or more control actions associated with increasing the additional amount of available relative movement between the disc blades 32 and the frame 16 when the determined additional amount of available relative movement falls below the predetermined minimum threshold.

It is to be understood that the steps of the method 200 are performed by the controller 114 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 114 described herein, such as the method 200, is implemented in software code or instructions which are tangibly stored on a tangible computer readable medium. The controller 114 loads the software code or instructions via a direct interface with the computer readable medium or via a wired and/or wireless network. Upon loading and executing such software code or instructions by the controller 114, the controller 114 may perform any of the functionality of the controller 114 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring tool float on an agricultural implement, the system comprising:
an implement frame;
a rocker arm pivotably mounted to the implement frame;
a tool coupled to the rocker arm;
a biasing element coupled between the implement frame and the rocker arm, the biasing element configured to permit the tool to move relative to the implement frame;
a rotational position sensor configured to detect a parameter indicative of a rotational position of the rocker arm relative the implement frame, the rotational position being indicative of an additional amount of available relative movement between the tool and the implement frame; and
a controller communicatively coupled to the rotational position sensor, the controller configured to:
determine the additional amount of available relative movement between the tool and the implement frame based on data received from the rotational position sensor;
compare the determined additional amount of available relative movement between the tool and the implement frame to a predetermined minimum threshold; and
initiate a control action associated with increasing the additional amount of available relative movement between the tool and the implement frame when determined additional amount of available relative movement between the tool and the implement frame falls below the predetermined minimum threshold.

2. The system of claim 1, further comprising:
an actuator coupled between the tool and the rocker arm, the actuator configured to adjust the rotational position of the rocker arm relative to the implement frame such that the additional amount of available relative movement between the tool and the implement frame is changed.

3. The system of claim 1, wherein the control action comprises actively adjusting the rotational position of the rocker arm relative to the implement frame.

4. The system of claim 1, further comprising:
an actuator coupled between the tool and the rocker arm, the actuator configured to adjust a penetration depth of the tool in a manner changes the additional amount of available relative movement between the tool and the implement frame; and
a depth sensor configured to detect a parameter indicative of the penetration depth of the tool, the controller further configured to determine the penetration depth of the tool based on data received from the depth sensor.

5. The system of claim 4, wherein the controller is further configured to control an operation of the actuator to adjust the additional amount of available relative movement between the tool and the implement frame in a manner that maintains the penetration depth of the tool within a predetermined range.

6. The system of claim 5, wherein a downforce being applied to the tool is fixed during the operation of the actuator.

7. The system of claim 1, wherein the controller is further configured to generate a field map based on the determined penetration depth of the tool.

8. The system of claim 1, wherein the tool comprises a gang of disc blades.

9. The system of claim 1, wherein the biasing element comprises at least one spring.

10. A method for monitoring tool float on an agricultural implement, the agricultural implement including a frame, a rocker arm pivotably mounted to the frame, a tool coupled to the rocker arm, and a biasing element coupled between the frame and the rocker arm, the biasing element configured to permit the tool to move relative to the frame, the method comprising:
receiving, with a computing device, data from a rotational position sensor configured to detect a parameter indicative of a rotational position of the rocker arm relative the frame;
determining, with the computing device, an additional amount of available relative movement between the tool and the frame based on the received data; and when the determined additional amount of available relative movement between the tool and the frame falls below a predetermined threshold, initiating, with the computing device, a control action associated increasing the additional amount of available relative movement between the tool and the frame.

11. The method of claim 10, wherein the agricultural implement further includes an actuator coupled between the tool and the rocker arm, the method further comprising:
controlling, with the computing device, an operation of the actuator in a manner that adjusts the rotational position of the rocker arm relative to the frame such that the additional amount of available relative movement between the tool and the frame is changed.

12. The method of claim 10, wherein the control action comprises actively adjusting the rotational position of the rocker arm relative to the frame.

13. The method of claim 10, wherein the agricultural implement further includes an actuator coupled between the tool and the rocker arm, the method further comprising:
controlling, with the computing device, an operation of the actuator such that a penetration depth of the tool is adjusted in a manner that changes the additional amount of available relative movement between the tool and the frame; and
determining, with the computing device, the penetration depth of the tool based on data received from a depth sensor.

14. The method of claim 12, further comprising:
controlling, with the computing device, the operation of the actuator to adjust the additional amount of available relative movement between the tool and the frame in a manner that maintains the penetration depth of the tool within a predetermined range.

15. The method of claim 13 further comprising:
generating, with the computing device, a field map based on the determined penetration depth of the tool.

16. A system for monitoring tool float on an agricultural implement, the system comprising:
an implement frame;
a tool supported by the implement frame;
a rocker arm pivotably mounted to the implement frame;
a first biasing element coupled between a first end of the rocker arm and the implement frame; and
a second biasing element coupled between a second end of the rocker arm and the tool,
wherein the first biasing element and the second biasing element configured to permit the tool to move relative to the implement frame;
a rotational position sensor configured to detect a parameter indicative of a rotational position of the rocker arm relative the implement frame, the rotational position being indicative of an additional amount of available relative movement between the tool and the implement frame; and
a controller communicatively coupled to the rotational position sensor, the controller configured to determine the additional amount of available relative movement between the tool and the implement frame based on data received from the rotational position sensor and to compare the determined additional amount of available relative movement between the tool and the implement frame to a predetermined minimum threshold and wherein the controller is further configured to initiate a control action associated with increasing the additional amount of available relative movement between the tool and the implement frame when determined additional amount of available relative movement between the tool and the implement frame falls below the predetermined minimum threshold.

17. The system of claim 16, wherein the second biasing element comprises an actuator.

* * * * *